United States Patent
Hessenauer et al.

(10) Patent No.: US 9,027,587 B2
(45) Date of Patent: May 12, 2015

(54) METHOD FOR OPERATING A FLUID VALVE VIA AN OSCILLATING VALVE MOTION

(75) Inventors: Juergen Hessenauer, Moeglingen (DE);
Ulrich Foerch, Ludwigsburg (DE);
Manfred Schmitt, Heppenheim (DE);
Steffen Schumacher, Renningen (DE);
Nicole Weber, Schwieberdingen (DE);
Oliver Schell, Neckarwestheim (DE);
Christof Ott, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 964 days.

(21) Appl. No.: 12/737,322

(22) PCT Filed: May 28, 2009

(86) PCT No.: PCT/EP2009/056497
§ 371 (c)(1),
(2), (4) Date: Dec. 29, 2010

(87) PCT Pub. No.: WO2010/000546
PCT Pub. Date: Jan. 7, 2010

(65) Prior Publication Data
US 2011/0094590 A1    Apr. 28, 2011

(51) Int. Cl.
*F16K 31/02*    (2006.01)
*G05D 16/20*    (2006.01)
*G05D 7/06*    (2006.01)
*F16K 31/06*    (2006.01)

(52) U.S. Cl.
CPC .......... *G05D 16/2013* (2013.01); *G05D 7/0635* (2013.01); *F16K 31/0675* (2013.01); *G05D 16/202* (2013.01)

(58) Field of Classification Search
CPC ............ G05D 16/2013; G05D 16/202; G05D 7/0635; F16K 31/0675
USPC ................. 137/1, 487.5; 475/127; 192/85.63; 700/282; 701/51; 251/129.05, 129.15
See application file for complete search history.

(56) References Cited

U.S. PATENT DOCUMENTS

| | | | |
|---|---|---|---|
| 3,709,253 A * | 1/1973 | Spangenberg ................ 137/595 |
| 3,790,910 A * | 2/1974 | McCormack ................. 702/138 |
| 4,399,836 A * | 8/1983 | de Versterre et al. ...... 137/487.5 |
| 4,706,703 A * | 11/1987 | Takeuchi et al. ........... 137/487.5 |
| 5,222,417 A | 6/1993 | Sato |
| 6,073,644 A * | 6/2000 | Friedmann et al. ............... 137/1 |
| 6,138,810 A * | 10/2000 | Fujii et al. .................. 192/85.01 |
| 6,155,654 A * | 12/2000 | Oyama ....................... 303/117.1 |
| 2004/0225429 A1* | 11/2004 | Keim et al. ..................... 701/51 |
| 2006/0011878 A1 | 1/2006 | Denyer et al. |
| 2006/0052904 A1* | 3/2006 | Brodeur et al. ............... 700/282 |
| 2006/0272919 A1* | 12/2006 | Kawamoto et al. ......... 192/88 R |

FOREIGN PATENT DOCUMENTS

| | | |
|---|---|---|
| CN | 2213872 | 11/1995 |
| CN | 2515661 | 10/2002 |

(Continued)

*Primary Examiner* — Kevin Murphy
(74) *Attorney, Agent, or Firm* — Kenyon & Kenyon LLP

(57) ABSTRACT

In a method for operating a fluid valve for controlling or regulating a fluid, having at least one movable valve component is displaceable with the aid of at least one electrical actuating signal which contains at least one first actuating signal portion which causes an oscillating valve motion of the valve component. Pressure oscillations generated in the fluid due to the oscillating valve motion are detected, and are used for regulation of the oscillating valve motion caused by the first actuating signal portion.

16 Claims, 1 Drawing Sheet

(56) References Cited

FOREIGN PATENT DOCUMENTS

| CN | 2527818 | 12/2002 |
| DE | 31 37 419 | 3/1983 |
| EP | 0 929 020 | 7/1999 |
| WO | WO 2006/037715 | 4/2006 |

* cited by examiner

METHOD FOR OPERATING A FLUID VALVE VIA AN OSCILLATING VALVE MOTION

BACKGROUND OF THE INVENTION

1. Field of the Invention

The present invention relates to a method for operating a fluid valve for controlling or regulating a fluid, having at least one movable valve component which is displaceable with the aid of at least one electrical actuating signal which contains at least one first actuating signal portion which causes an oscillating valve motion of the valve component.

2. Description of Related Art

Hydraulic systems are designed to be primarily current-controlled, using actuators for electrohydraulic actuations. In the current-controlled system, disturbance variables in the hydraulic system, such as fluctuations in a pressure supply system, for example, are typically adjusted via fixed hydraulic gates and tolerances. Adjusting the hydraulic system to various temperatures is therefore complicated, and it is not possible to adjust influences which change the system, such as contaminants, cuttings, and aging phenomena. The disadvantages of the current-controlled hydraulic system are counteracted by instead operating in a pressure-controlled manner. Adjustment of the disturbance variables is possible and easy to implement in pressure-controlled hydraulic systems. One disadvantage is that appropriate actuators which are required are frequently characterized by nonlinearity, volatility, and ambiguity.

In addition, regardless of whether they are current-controlled or pressure-controlled, actuators for electrohydraulic actuations of hydraulic systems have nonlinear behavior patterns, such as static friction to sliding friction transitions, which adversely affect control and disturbance behavior during a regulation. To counteract this, the actuators are provided with a low-frequency motion superimposition which in a current-controlled manner keeps movable parts of the actuators in constant motion. Static friction to sliding friction transitions are thus avoided. The motion superimposition is provided with a small motion amplitude to avoid creating interfering pressure changes. To be able to use such motion superimpositions in a targeted and efficient manner it is necessary to have accurate knowledge of friction parameters of the actuators, which requires that constant environmental conditions and actuators having low parametric scattering are present during manufacture of the actuators. Here as well, long-term influences such as aging phenomena are not taken into account during regulation of the motion superimposition.

A method of the above-mentioned type is disclosed in published international patent application document WO 2006037715. A solenoid valve is controlled with the aid of a pulse-width modulation signal to which an oscillating signal is added, which allows an armature of the solenoid valve to oscillate with constant small oscillations about a central position in a targeted manner.

U.S. Pat. No. 5,222,417 discloses an oscillating signal which sets a valve into oscillation, the oscillating signal being regulated on the basis of a flow rate.

Published European patent document EP 0929020 describes a method for controlling an electromagnetic proportional pressure control valve having an oscillation for the motion superimposition. The motion superimposition has no effect on the pressure which is regulated by the pressure control valve.

It is necessary to provide a method which in a simple manner allows a motion superimposition which is constant in spite of changing environmental conditions, parametric scattering of actuators, and long-term influences such as aging phenomena.

BRIEF SUMMARY OF THE INVENTION

According to the present invention, it is provided that pressure oscillations generated in the fluid due to the oscillating valve motion are detected and are used for regulating the oscillating valve motion caused by the first actuating signal portion. The effects of the fluid valve on the fluid are directly regulated by regulating the oscillating valve motion (motion superimposition). Compared to a current-controlled procedure, in the present case it is not necessary to know friction parameters in the fluid valve in order to achieve a highly accurate control result. At the same time, as the result of detecting the pressure oscillations, all nonlinearities, volatilities, and ambiguities of the fluid valve are also detected, so that changed environmental conditions, deviations in parameters due to parametric scattering during manufacture, and long-term influences on the fluid valve are also taken into account during the regulation. It is particularly advantageous that, using the present invention, robust parameterizations and controller adjustments may be carried out for large batches of fluid valves having significant manufacture-related parametric scattering. In addition, during manufacturing, fluid valves may be provided with less precise tolerances, thus reducing the number of fluid valve rejects during manufacturing. Furthermore, the level of effort for calibration for pressure-controlled regulation of the oscillating valve motion is less than that for current-controlled regulation. In addition, a malfunction of the fluid valve may be identified when a system deviation appears at the fluid valve. Using the method according to the present invention is particularly advantageous in a pressure-controlled hydraulic system, since detection of pressure is already provided.

According to one refinement of the present invention, it is provided that the volumetric flow and/or the pressure of the fluid is/are controlled and/or regulated.

According to one refinement of the present invention, it is provided that, for controlling or regulating the fluid via at least one second actuating signal portion of the actuating signal, the valve component undergoes a basic motion which results in basic pressure changes in the fluid. The second actuating signal portion causes a displacement of the valve component (the basic motion) which triggers a desired control or regulation effect within the fluid. A basic pressure change results in the fluid due to the basic motion. The oscillating valve motion is superimposed on the basic motion, resulting in a joint overall motion.

According to one refinement of the present invention, it is provided that the basic motion and the oscillating valve motion are regulated together or separately based on at least one setpoint value. Joint regulation of the basic motion and the oscillating valve motion results in a multivariable regulation, and thus in very good overall control and disturbance behavior, resulting in high control quality. Basic motion and oscillating valve motion may be regulated separately with the aid of simple regulation methods. In particular, a simple linear regulation, such as a proportional regulation, may be provided for regulating the oscillating valve motion. Use of these simple regulation methods results in very cost-effective, simple, and robust implementation of the method according to the present invention.

According to one refinement of the present invention, it is provided that the sum of basic pressure changes and pressure oscillations represents overall pressure changes in the fluid.

As the result of superimposing the oscillating valve motions and basic motions, the resulting changes in the pressure of the fluid are also superimposed, thus forming overall pressure changes. Formation of the overall pressure changes allows the effect of the overall motion to be easily detected, since it is necessary to detect only one pressure at a single location in the fluid.

According to one refinement of the present invention, it is provided that the pressure oscillations are ascertained from the overall pressure changes by computing or filtering. The pressure oscillations may be ascertained from the overall pressure changes in particular when a specific basic pressure change is known and/or expected. In this case, it is only necessary to subtract the basic pressure change from the overall pressure changes. In addition, due to the oscillating character of the valve motion it is possible to filter out a periodic portion from the overall pressure changes, using appropriate filters, for example a band-pass filter. The basic motions, which are very sluggish compared to the oscillating valve motion, may be filtered out using a low-pass filter, for example. Such filtering allows the basic motion and the oscillating valve motion to be regulated separately.

According to one refinement of the present invention, it is provided that the oscillating valve motion is regulated based on amplitudes of the pressure oscillations. Use of the amplitudes of the pressure oscillations as a control variable allows conclusions to be easily and reliably drawn concerning the amplitude of the oscillating valve motion. Very high control quality with a low level of necessary regulation effort results on account of a very direct and simple physical relationship between the oscillating valve motion and the pressure oscillations. When the amplitudes of the pressure oscillations are used as the control variable, it may be provided in particular that the detected values of the pressure oscillations are further improved using additional filters, estimations, and approximations in order to further improve the control quality. A setpoint amplitude is then supplied to the regulation system as a setpoint value.

According to one refinement of the present invention, it is provided that sudden variations in the pressure oscillations and/or in the setpoint value are linearized. Sudden variations in the pressure oscillations may result from nonlinear influences such as, for example, mechanical play in the fluid valve. In addition, very rapid setpoint value changes in the form of sudden variations of the setpoint value may be desired. Such sudden variations are disadvantageous within a regulation system, since they may result in undesired regulation states and intense oscillations. It is therefore advantageous for sudden variations to be linearized, in particular before they are supplied to the regulation system. Linearization may be achieved, for example, by initially delaying the sudden variation, and providing a linear transition in the form of a ramp during the delay.

According to one refinement of the present invention, it is provided that a hydraulic valve is used as the fluid valve.

According to one refinement of the present invention, it is provided that a solenoid valve is used as the fluid valve. Using a solenoid valve allows simple implementation of the actuating signal, and thus of the actuating signal portions in the form of oscillating electrical signals, which are superimposed on one another to form the actuating signal.

According to one refinement of the present invention, it is provided that a pulse-width modulation signal is used as an actuating signal. Such regulations result in great robustness and great flexibility at low cost.

According to one refinement of the present invention, it is provided that an electrical output stage receives the actuating signal, and generates a valve actuating signal which energizes a coil of the solenoid valve. Based on the actuating signal, the electrical output stage is able to provide a valve actuating signal which has enough electrical energy to displace the valve component of the solenoid valve with the aid of a coil. Thus, it is possible to generate the actuating signal having low electrical energy, whereas a high expenditure of electrical energy is limited to the solenoid valve.

According to one refinement of the present invention, it is provided that the valve actuating signal has an actuating frequency, and the oscillating valve motion is brought about by reducing the actuating frequency. It is provided that the electrical output stage, as a valve actuating signal, provides a periodic signal, for example a carrier signal having a carrier frequency. The actuating frequency is thus reduced low enough that the valve component together with the valve motion is able to conform to the reduced actuating frequency. It is conceivable to reduce this actuating frequency, for example, by superimposing the actuating signal with an additional low-frequency signal.

According to one refinement of the present invention, it is provided that the valve signal energizes the coil, having the reduced actuating frequency, for generating the oscillating valve motion.

According to one refinement of the present invention, it is provided that the fluid valve is used in an automatic transmission, in particular of a vehicle. Using the fluid valve in the automatic transmission results in highly accurate control of the automatic transmission while at the same time reducing costs, since fluid valves having fairly large tolerances may be used. In addition, the service life of the automatic transmission is increased since long-term influences of the valves are taken into account by the regulation system, thus maintaining high control quality over a long time period.

According to one refinement of the present invention, it is provided that the fluid valve in the automatic transmission activates a transmission brake and/or a transmission clutch. When the transmission brake or transmission clutch is activated, the high accuracy of the fluid valves results in precise shifting operations. These minimize wear of the automatic transmission and therefore increase its service life. In addition, due to the precise activation of the transmission brake or the transmission clutch the fluid valve may be used to significantly speed up the shifting operations in the automatic transmission.

According to one refinement of the present invention, it is provided that at least one fluid gate is associated with the transmission brake and/or transmission clutch, and the overall pressure changes are fluidically detected upstream and/or downstream from the fluid gate. The transmission brake or the transmission clutch is usually controlled by a hydraulic system. Fluid gates are provided within this hydraulic system which retard pressure compensation from one flow side of the fluid gate to the other flow side of the fluid gate, thus filtering out interfering influences, such as high-frequency oscillations in the hydraulic system. Detection of the overall pressure changes downstream from the fluid gate allows the overall pressure changes to be detected, for which interfering influences have already been removed by the fluid gate. As a result, postprocessing of the detected overall pressure changes for high control quality may be simplified or completely dispensed with. Detection of the overall pressure changes upstream from the fluid gate allows the overall pressure changes to be detected in a particularly complete manner, since no filtering is carried out by the fluid gate. It is also conceivable to detect the overall pressure changes upstream as well as downstream from the fluid gate, and to filter out interferences by comparing the two values.

According to one refinement of the present invention, it is provided that the oscillating valve motion is essentially a sinusoidal motion. This results in a particularly simple detection of the resulting pressure oscillations, which likewise have a sinusoidal character. The pressure oscillations may also be filtered very easily from the detected overall pressure changes. Lastly, very simple and robust regulation may be achieved by using the sinusoidal motion as the oscillating valve motion.

Moreover, the present invention relates to a control device for operating a fluid valve for controlling or regulating a fluid, in particular according to one of the preceding methods, the fluid valve having at least one movable valve component which is displaceable by the control device with the aid of at least one electrical actuating signal which has at least one first actuating signal portion which causes an oscillating valve motion of the valve component, the fluid having pressure oscillations due to the oscillating valve motion, and the control device together with the pressure oscillations and the actuating signal forming a valve motion regulation system.

DETAILED DESCRIPTION OF THE INVENTION

Figure 1:
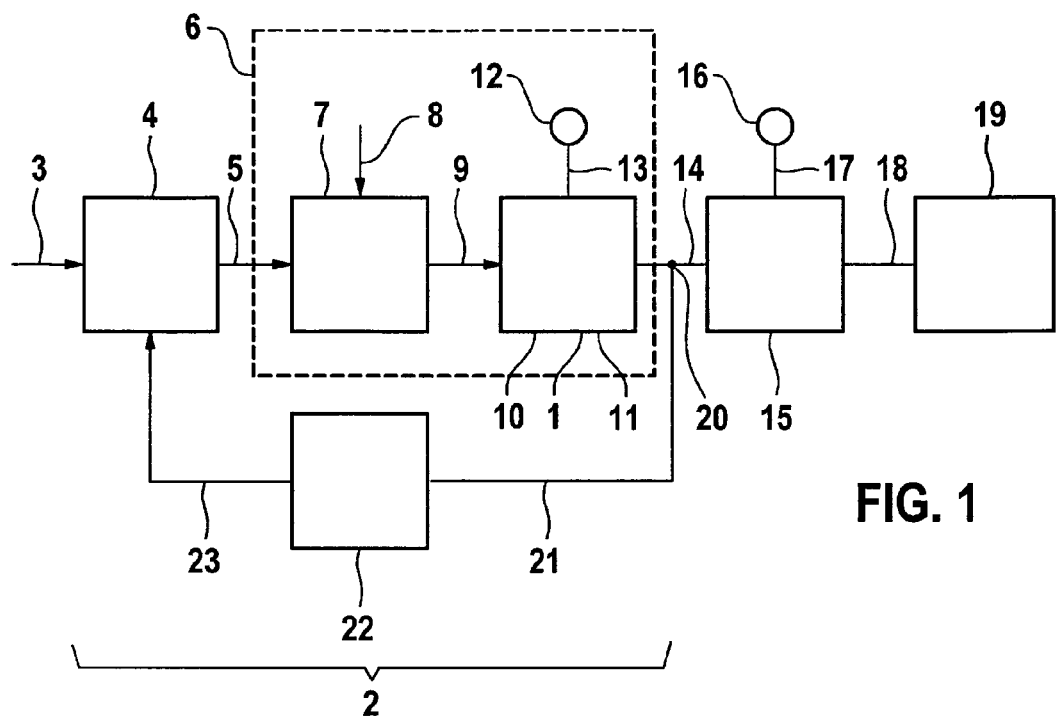
FIG. 1 shows a block diagram of a regulation system for an oscillating valve motion.

FIG. 1 illustrates the method according to the present invention for operating a fluid valve 1 which is present in a control loop 2 in a hydraulic system (not illustrated) of an automatic transmission of a vehicle (likewise not illustrated). Fluid valve 1 contains a valve component, not illustrated, which is displaceable with the aid of the actuating signal. Control loop 2 is supplied with a setpoint value $P_{1ref}$ via an arrow 3, in that setpoint value $P_{1ref}$ is transmitted to a control device 4. An actuating signal is relayed to a controlled system 6 via an arrow 5. Controlled system 6 has an electrical output stage 7, to which the actuating signal is transmitted via arrow 5. Electrical output stage 7 also receives a supply voltage $U_{Batt}$ via an arrow 8. Electrical output stage 7 generates a valve actuating signal, which acts on fluid valve 1 via an arrow 9. Fluid valve 1 is designed as a solenoid valve 10, which represents a hydraulic valve 11. Fluid valve 1 is supplied with a supply pressure $p_{VD}$ from a pressure accumulator 12 via a line 13. Fluid valve 1 relays an overall pressure $p_1$ to a pressure booster 15 via a line 14. A pressure accumulator 16 which supplies pressure booster 15 with a system pressure $p_{sys}$ via a line 17 is associated with pressure booster 15. Pressure booster 15 boosts overall pressure $p_1$, and thus generates a boosted pressure $p_2$, which is relayed to a transmission clutch 19 of the automatic transmission via a line 18. It is also conceivable that for control, pressure $p_2$ may be relayed to a transmission brake instead of to transmission clutch 19. Line 14 has a branch 20 which is connected to a line 21, which relays overall pressure $p_1$ to a pressure sensor 22. Pressure sensor 22 detects the values of overall pressure $p_1$, and transmits the values to control device 4 via an arrow 23. Lines 13, 14, 17, 18, and 21 contain a fluid 24.

Illustrated control loop 2 controls overall pressure $p_1$ via fluid valve 1. For this purpose, setpoint value $P_{1ref}$ is transmitted to control device 4. Control device 4 then generates the actuating signal, which is amplified by electrical output stage 7, thus generating the valve actuating signal. The valve actuating signal is able to displace the valve component of fluid valve 1 to allow pressure $p_1$ to thus be influenced. As a result of displacing the valve component, supply pressure $p_{VD}$ is completely or partially led from pressure accumulator 12 into line 14. Overall pressure $p_1$ adjusted in this manner is relayed to pressure sensor 22 via branch 20 and line 21 connected thereto. Pressure sensor 22 measures overall pressure $p_1$ and transmits the values thus detected, i.e., measured, back to control device 4. To be able to achieve an effect within the automatic transmission, overall pressure $p_1$ is boosted with the aid of pressure booster 15. For this purpose, pressure accumulator 16 is associated with pressure booster 15. Pressure booster 15 receives system pressure $p_{sys}$, which is used for boosting overall pressure $p_1$, from pressure accumulator 16 via line 17. Pressure booster 15 thus generates boosted pressure $p_2$, which is able to activate transmission clutch 19 via line 18.

Figure 2:
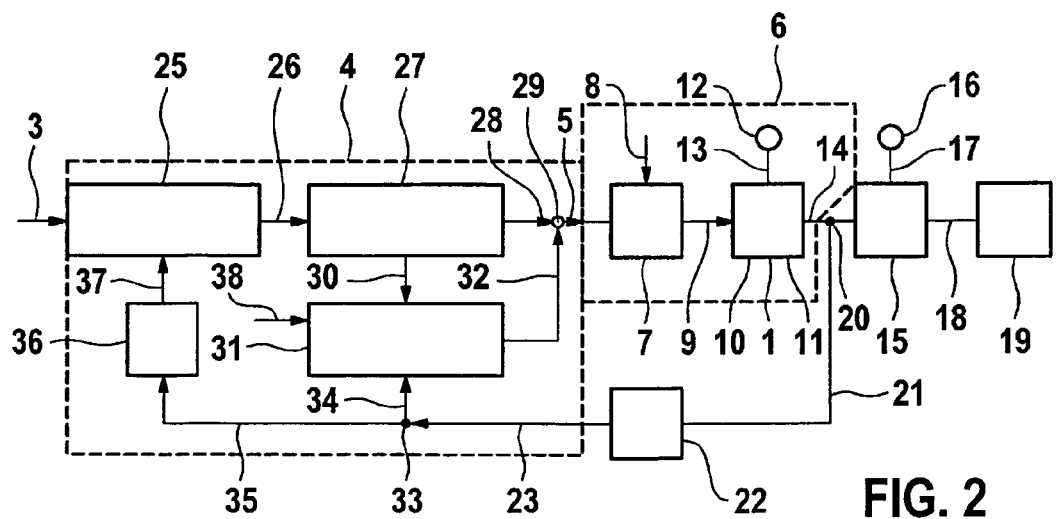
FIG. 2 shows an expanded block diagram of the regulation system for the oscillating valve motion.

FIG. 2 shows the method for operating fluid valve 1 from FIG. 1, illustrating control device 4 in detail. Control device 4 is illustrated in dashed lines, and contains multiple components. The control device contains a pressure controller 25, to which setpoint value $P_{1ref}$ is transmitted via arrow 3. Pressure controller 25 generates an actuating signal, which is relayed to a pulse-width modulation generator 27 via an arrow 26. Pulse-width modulation generator 27 generates a pulse-width modulation signal, which represents a second actuating signal, which is relayed to a superimposition point 29 via arrow 28. In addition, pulse-width modulation generator 27 transmits the pulse-width modulation signal via an arrow 30 to a block 31, which receives a setpoint value in the form of a setpoint amplitude via an arrow 38. Block 31 generates a first actuating signal, which is relayed to superimposition point 29 via an arrow 32. Superimposition point 29 is connected to electrical output stage 7 via arrow 5, and superimposes the first actuating signal portion with the second actuating signal portion, thus generating the actuating signal. Starting from pressure sensor 22, the values detected by pressure sensor 22 are transmitted to control device 4 via arrow 23. Arrow 23 leads to a branch 33, which transmits the values to block 31 via an arrow 34, and transmits the values to a filter 36 via a further arrow 35. The filter may be a low-pass filter, for example. Filter 36 filters the values or carries out computations based on the values from arrow 35, and relays the results to pressure controller 25 via an arrow 37. Moreover, it is conceivable that values from block 31, such as the pressure oscillations, for example, are used for the computations.

A basic motion and an oscillating valve motion of fluid valve 1 are controlled separately within control device 4. Block 31 has a controller which controls the oscillating valve motion, while pressure controller 25 is responsible for controlling only the basic motion. Thus, two control paths result within control device 4. A first control path begins with pressure controller 25, which with the aid of its actuating signal generates the second actuating signal portion via pulse-width modulation generator 27, which causes a basic motion of the valve component. The basic pressure changes in overall pressure $p_1$ result from the basic motion of the valve component. The values of the basic pressure changes together with the values of the overall pressure changes are detected by pressure sensor 22 and relayed to filter 36. Thus, with the aid of filter 36 the basic pressure changes may be filtered from the overall pressure changes and sent back to pressure controller 25, thus closing the first control path. A second control path begins at branch 33, and then extends via block 31 to controlled system 6. The return in the second control path results via pressure sensor 22, via arrows 21 and 23. Block 31 has a band-pass filter which filters pressure oscillations from the values of the detected overall pressure changes. The amplitudes of the pressure oscillations are compared to the predefined setpoint amplitude from arrow 38, and are regulated by the controller contained in block 31. This controller may be designed as a simple linear controller, for example. The pulse-width modulation signal is modified in block 31 in such a way that it results in a first actuating signal portion. This first actuating signal portion is superimposed with the second actuating signal portion in superimposition point 29, thus forming the actuating signal. The return to block 31 is carried out from superimposition point 29 to branch 33, the same as in the first control path. Starting from branch 33, the values of the overall pressure changes detected by pressure sensor 22 are transmitted to block 31, thus closing the second control path. Due to the separation of a regulation of the basic motion and the oscillating valve motion, particularly good control quality of the oscillating valve motion is possible using the controller of block 31. To be able to ensure a particularly good regulation, it is also conceivable to linearize the volatile areas when volatile variations of the overall pressure are detected in pressure sensor 22. This prevents the controller in block 31 from attempting to adjust for volatilities, which typically results in an increase in its manipulated variable (the first actuating signal portion), and even limitation of the manipulated variable.

Furthermore, it is conceivable that an overall setpoint value may also be transmitted to control device 4 via arrow 3. The overall setpoint value thus simultaneously contains setpoint value $p_{1ref}$ and the setpoint amplitude. To be able to use the overall setpoint value for pressure controller 25 as well as for the controller of regulation system 31, the overall setpoint value is initially subdivided (not illustrated) into setpoint value $p_{1ref}$ and the setpoint amplitude. These values are correspondingly transmitted to pressure controller 25 and to the controller of block 31. Such a subdivision may be achieved by filtering, for example, in the same way this is carried out in control device 4 using the detected values from pressure sensor 22.

What is claimed is:

1. A method for operating a fluid valve for regulating a fluid, comprising:
   providing at least one movable valve component;
   actuating the at least one movable valve component with the aid of at least one electrical actuating signal, wherein the actuating signal contains at least one first actuating signal portion and at least one second actuating signal portion, wherein the first actuating signal portion causes an oscillating valve motion of the valve component and the at least one second actuating signal portion causes a displacing basic motion of the valve component;
   detecting pressure oscillations generated in the fluid due to the oscillating valve motion, wherein at least one of volumetric flow and a pressure of the fluid is regulated,
   wherein for regulating the fluid via the at least one second actuating signal portion, the displacing basic motion of the valve component results in pressure changes in the fluid; and
   using the detected pressure oscillations for a regulation of the oscillating valve motion caused by the first actuating signal portion,
   wherein a sum of the pressure changes from the displacing basic motion of the valve component and the pressure oscillations represents overall pressure changes in the fluid, and
   wherein the pressure oscillations are ascertained from the overall pressure changes by filtering.

2. The method as recited in claim 1, wherein the displacing basic motion of the valve component and the oscillating valve motion of the valve component are regulated based on at least one setpoint value.

3. The method as recited in claim 2, wherein the oscillating valve motion is regulated based on amplitudes of the pressure oscillations.

4. The method as recited in claim 2, wherein sudden variations in at least one of the pressure oscillations and the setpoint value are linearized.

5. The method as recited in claim 2, wherein a hydraulic valve is used as the fluid valve.

6. The method as recited in claim 2, wherein a solenoid valve is used as the fluid valve.

7. The method as recited in claim 6, wherein an electrical output stage receives the actuating signal and generates a valve actuating signal energizing a coil of the solenoid valve.

8. The method as recited in claim 7, wherein the valve actuating signal has an actuating frequency, and the oscillating valve motion is generated by reducing the actuating frequency.

9. The method as recited in claim 8, wherein the valve signal energizes the coil, having the reduced actuating frequency, for generating the oscillating valve motion.

10. The method as recited in claim 8, wherein the oscillating valve motion is a sinusoidal motion.

11. The method as recited in claim 2, wherein a pulse-width modulation signal is used as the actuating signal.

12. The method as recited in claim 2, wherein the fluid valve is used in an automatic transmission of a vehicle.

13. The method as recited in claim 12, wherein the fluid valve in the automatic transmission activates at least one of a transmission brake and a transmission clutch.

14. The method as recited in claim 13, wherein at least one fluid gate is associated with the at least one of the transmission brake and the transmission clutch, and the overall pressure changes are fluidically detected at least one of upstream and downstream from the fluid gate.

15. The method as recited in claim 1, wherein the pressure oscillations are ascertained from the overall pressure changes by a band-pass filter.

16. A control system for operating a fluid valve for regulating a fluid, the fluid valve having at least one movable valve component, comprising:
   a control unit configured to control actuating the at least one movable valve component with the aid of at least one electrical actuating signal, wherein the actuating signal contains at least one first actuating signal portion and at least one second actuating signal portion, wherein the first actuating signal portion causes an oscillating valve motion of the valve component and the at least one second actuating signal portion causes a displacing basic motion of the valve component; and
   a pressure sensor configured to detect pressure oscillations generated in the fluid due to the oscillating valve motion, wherein at least one of volumetric flow and a pressure of the fluid is regulated,
   wherein for regulating the fluid via the at least one second actuating signal portion, the displacing basic motion of the valve component results in pressure changes in the fluid;
   wherein the detected pressure oscillations are used for a regulation of the oscillating valve motion caused by the first actuating signal portion, wherein a sum of the pressure changes from the displacing basic motion of the valve component and the pressure oscillations represents overall pressure changes in the fluid, and wherein the pressure oscillations are ascertained from the overall pressure changes by filtering.

* * * * *